INVENTORS
Carl S. Hoffman &
BY Virgin C. Reddy

ATTORNEY

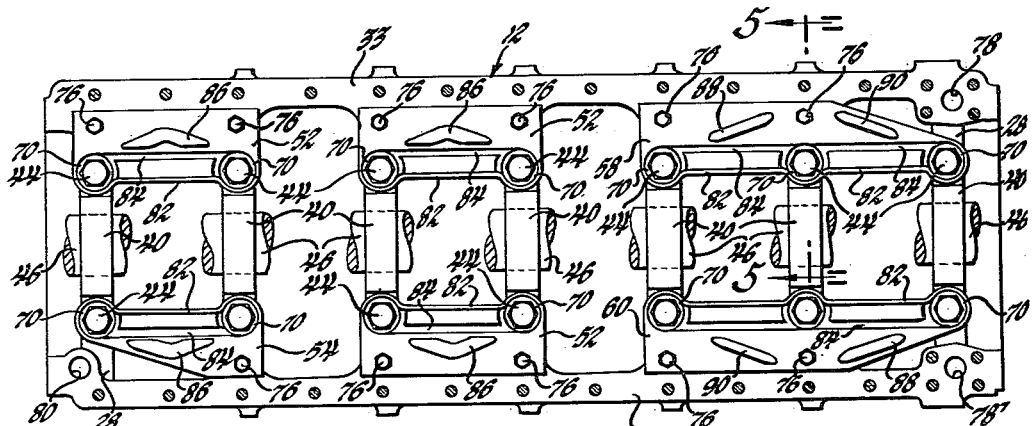

July 31, 1962

C. S. HOFFMAN ETAL
CRANKCASE AND BEARING STRUCTURE FOR
INTERNAL COMBUSTION ENGINES 3,046,954

Filed Jan. 18, 1961

INVENTORS
Carl S. Hoffman &
BY Virgin C. Reddy
C. E. James
ATTORNEY

INVENTORS
Carl S. Hoffman &
BY Virgin C. Reddy
E. E. James
ATTORNEY

United States Patent Office 3,046,954
Patented July 31, 1962

3,046,954
CRANKCASE AND BEARING STRUCTURE FOR INTERNAL COMBUSTION ENGINES
Carl S. Hoffman, Royal Oak, and Virgin C. Reddy, Livonia, Mich., assignors to General Motors Corporation, Detroit, Mich., a corporation of Delaware
Filed Jan. 18, 1961, Ser. No. 83,554
20 Claims. (Cl. 121—194)

This invention relates to an internal combustion engine and more particularly to the crankcase and crankshaft supporting portions thereof.

The invention contemplates an improved crankshaft bearing support arrangement contributing substantial structural strength and rigidity to the crankcase defining portions of an internal combustion engine thus permitting the design and use of a lighter and more compact overall engine design relative to those permitted by previous crankcase and bearing supporting structures. The invention further permits modification of existing engine designs to accommodate substantial increases in the power output ratings of such engines, such as may be achieved by turbocharging.

For illustrative purposes, several forms of the invention are described and shown herein as embodied in a V-engine of the type shown and described in copending United States patent application, Serial No. 1,488, filed January 11, 1960, in the names of Harold H. Albinson, George P. Hanley, Kenneth L. Hulsing, Harvey G. Humphries, and John J. May, and entitled, "Two-Cycle Internal Combustion Engine." To permit maximum parts interchangeability between the illustrative V-engine and an existing inline series of engines having identical cylinder bore and stroke dimensions, the connecting rods of transversely adjacent cylinders of the V-engine are preferably journaled on the same crankpin in side-by-side relation in the manner shown and described in copending United States patent application, Serial No. 856,066, filed November 30, 1959, in the names of Carl S. Hoffman and Kenneth L. Hulsing, and entitled, "Connecting Rod and Crankshaft Connection for Internal Combustion Engine." Although having particular utility in such an illustrative V-engine environment, the invention might be similarly used in converting a conventional crankcase and bearing supporting structure of cast iron or steel to a light metal casting, i.e. of a suitable aluminum alloy, while maintaining critical dimensional limits imposed by the original engine structure. In its broader aspects, the invention is further considered to be applicable to the design of lighter, stronger, more rigid and compact crankcase and bearing supporting structures for internal combustion engines generally.

In the illustrative V-engine environment of the invention, longitudinally spaced main journal portions of an engine crankshaft are rotatably supported by bearings carried by mating bearing arches and caps secured thereto. The several bearing supporting arches are integral with and supported by partition webs and structural members extending transversely between and integral with crankcase defining side walls. The width and diameter of the several main crankshaft bearings and journals are dictated by the desired cylinder spacing and the necessary maintenance of bearing loads within acceptable peak and mean limits. Such bearing loads are of course related to the power output per cylinder and to the cylinder firing order provided by the selected crankshaft throw arrangement. The necessary diameters of the main bearings and journals increase the effective lever arm dimensions of their mating bearing surfaces and thus compound the effects of crankshaft deflections or rocking couples and of the torsional and thrust loads acting on or through the several bearing supporting arches and caps. With successive firings in the several adjacent V arranged cylinders, the resultant overlap of power or thrust load applied to the corresponding crankshaft portion imposes peak stresses within the adjacent bearing supporting structures. Such peak stresses may be substantially greater than those imposed on a corresponding inline engine and occur at a high cyclic rate. This repetitious high stress impacting and flexing of the bearing supporting structures may eventually result in failure of the several bearing supporting arches and caps.

In accordance with the invention, the several longitudinally adjacent main bearings caps are structurally interconnected to each other and/or to the adjacent crankcase side walls by tie plates suitably secured thereto. The lower face of the crankcase side walls and of the main bearing caps are substantially coplanar and of a depth preventing interference between the tie plates and the connecting rod crankthrow connections. The tie plate reinforced structures thus provided increase crankcase and bearing supporting strength and rigidity and absorb and distribute the longitudinal and transverse rocking couples and the transverse tensive and compressive loadings which are alternately imposed on the main bearing caps and crankcase bearing webs by torsional and longitudinal crankshaft flexures resulting from the sequential firings occurring within the several cylinders.

The foregoing and other objects, advantages and features of the invention will be readily apparent from the following description of the several illustrative embodiments thereof, having reference to the accompanying drawings, in which:

FIGURE 2 is taken substantially in the direction of the arrows and in the plane of the line indicated at 2—2 in FIGURE 1 and shows a preferred form of the invention as applied to a twelve-cylinder V-engine;

FIGURE 3 is a view similar to FIGURE 2 showing a preferred embodiment of the invention in an eight-cylinder V-engine;

FIGURE 4 is a view similar to FIGURES 2 and 3 and shows a preferred embodiment of the invention in a six-cylinder V-engine;

FIGURE 5 is an enlarged fragmentary sectional view taken substantially in the direction of the arrows and in the plane of the line indicated at 5—5 of FIGURE 2;

Figure 1:
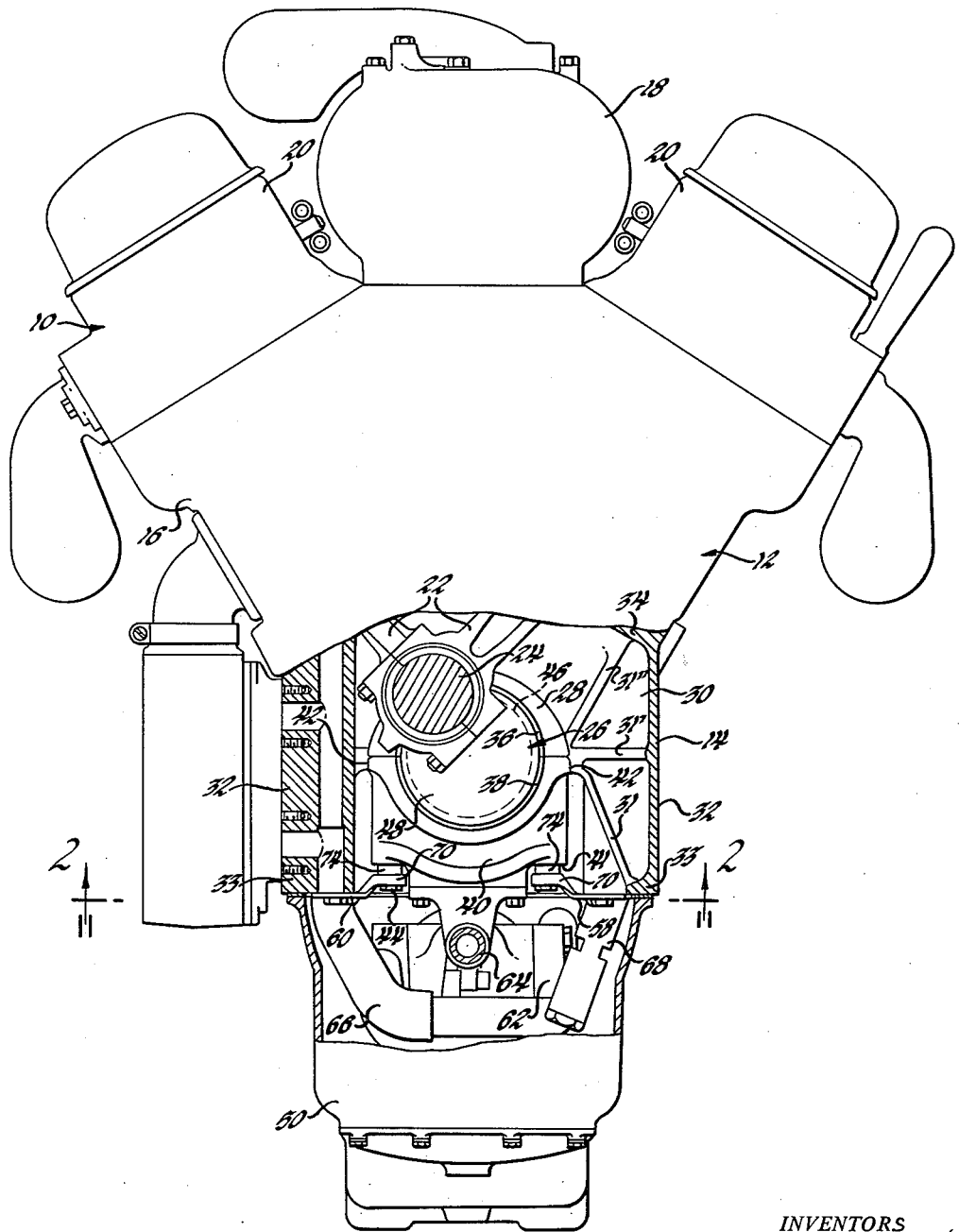
FIGURE 1 is a view showing a V-engine in front elevational outline with portions thereof broken away to show the illustrative environment of the invention in transverse section.
Figure 6:
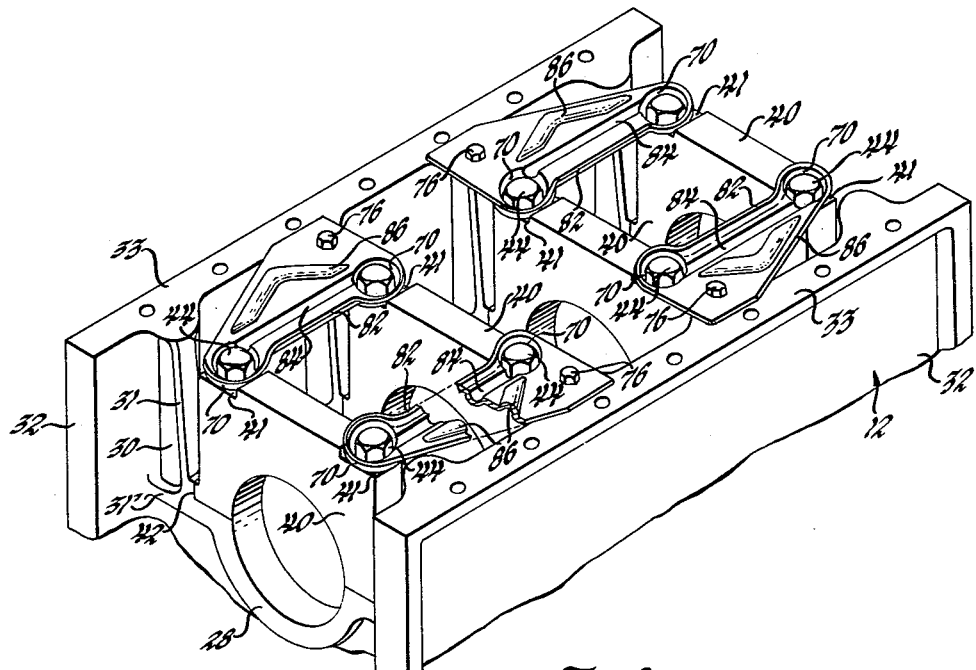
FIGURE 6 is a fragmentary view showing an embodiment of the invention similar to FIGURE 4 in perspective elevation.

Referring more particularly to FIGURE 1, a two-cycle uniflow scavenged engine is indicated generally by the reference numeral 10 and includes a cylinder block 12 having a lower crankcase defining portion 14 and an upper cylinder defining portion 16. The upper block portion 16 defines two radially inclined banks of inline cylinders. An engine driven blower 18 is mounted on the upper block portion intermediate the cylinder banks and is adapted to supply pressurized scavenged and charging air to an air receiving chamber extending longitudinally and transversely of the upper block portion between the cylinders. Two cylinder heads 20 having overhead exhaust valves and fuel injectors are mounted on the upper inclined face of the cylinder block in flanking relation to the blower. These heads close the upper ends of the several block defined cylinders and cooperate with pistons, not shown, reciprocably mounted therein to define a plurality of expansible combustion chambers. The several pistons are drivingly connected by connecting rods 22 to corresponding crankpins 24 of a crankshaft 26 which is rotatably supported by the lower crankcase defining portion of the cylinder block.

The crankcase defining portion of the block has a plurality of main bearing supporting arches 28 spaced longitudinally between the several cylinders and adjacent the ends of the block. These arches are integral with and carried by webs 30 and reinforcing columns 31, 31' and 31" which extend transversely between crankcase defining side walls 32 and a partition wall 34 separating the crankcase from the air receiving chamber of the upper block portion. The several arches 28 and bearing caps 40 secured thereto support mating bearing segments 36 and 38, respectively. The bearing caps are piloted in assembly by thrust shoulders 42 defined by their respective mounting arches and are secured thereto by bolts 44. The heads of the several bolts 44 engage thrust shoulders 41 finished by notching the lower corners of the bearing caps. The bearing arches, caps and segments rotatably support main journals 46 which are spaced and extend longitudinally of the crankshaft 26 between crankthrows 48 carrying the several crankpins 24. The crankcase defining side walls 32, the arch-defining webs 30 and columns 31", and the several bearing caps 40 extend below and avoid interference with the arcs swept by the several connecting-rod-to-crankpin connections. An oil pan assembly 50 is sealingly secured to the lower rails 33 defined by the crankcase side walls 32 and forms the bottom wall of the crankcase chamber.

In the several preferred embodiments of the invention shown in FIGURES 1–6, the adjacent bearing caps of the several illustrative crankcases are structurally interconnected to each other and to the adjacent crankcase defining side walls by an appropriate selection from a plurality of stamped plates 52, 54, 56, 58 and 60. The stamped configurations of these several plates provide necessary load distributive rigidity to the crankshaft bearing supporting structure while permitting the mounting of various accessories within the oil pan defined crankcase chamber. Such accessories may include an engine oil supply pump 62, intake and discharge connections 64 and 66 to the pump, and an oil pressure relief valve 68 as shown in FIGURE 1. In the following description, corresponding portions of the several plates 52, 54, 56, 58 and 60 are generally identified by the same reference numerals.

The several plates are provided with longitudinally spaced cup-shaped bosses 70 which are perforated to receive the clamping bolts 44 of the several adjacent bearing caps. As shown in FIGURE 5, the cup-shaped bosses are each interposed in assembly between a washer 72 and a spacer ring 74 and clamped to the bearing cap thrust shoulders 41 by the cap bolts. The plates 52 are substantially rectangular in form and perforated outwardly opposite each of the bosses 70 to receive two screws or bolts 76 securing the plate member to the pan rail 33 of the adjacent crankcase side wall. The plates 54 and 56 are triangular in shape and the plates 58 and 60 are trapezoidal in shape to avoid oil pump supply connections and pressure relief valves mateable with ports 78, 78' and 80 opening on the pan rails of the several crankcases. Because of their triangular shape, the plates 54 and 56 are each perforated outwardly opposite one of the cap bolt bosses 70 and secured to the adjacent crankcase side wall by only one screw or bolt 76 extending therethrough. The trapezoidal plates 58 and 60 are similarly perforated outwardly and secured to the adjacent crankcase side walls by two screws or bolts 76 extending therethrough opposite two of the bosses 70. To provide requisite load transmitting rigidity between the adjacent bearing caps and crankcase side walls, the several plate members have oppositely disposed flanges 82 and bosses 84 extending longitudinally thereof between the several bosses 70. The several plate members 52, 54 and 56 are further reinforced by crescent or V shaped bosses 86 extending longitudinally and outwardly thereof between the several cap bolt bosses. The trapezoidal plate members 58 and 60 are similarly reinforced by bosses 88 and 90 disposed oppositely of the bosses 84 and extending longitudinally and obliquely thereof between the bosses 70 adjacent each end of these plate members and the bolt 76 securing the plate member to the pan rail opposite the center boss 70.

Figure 7:
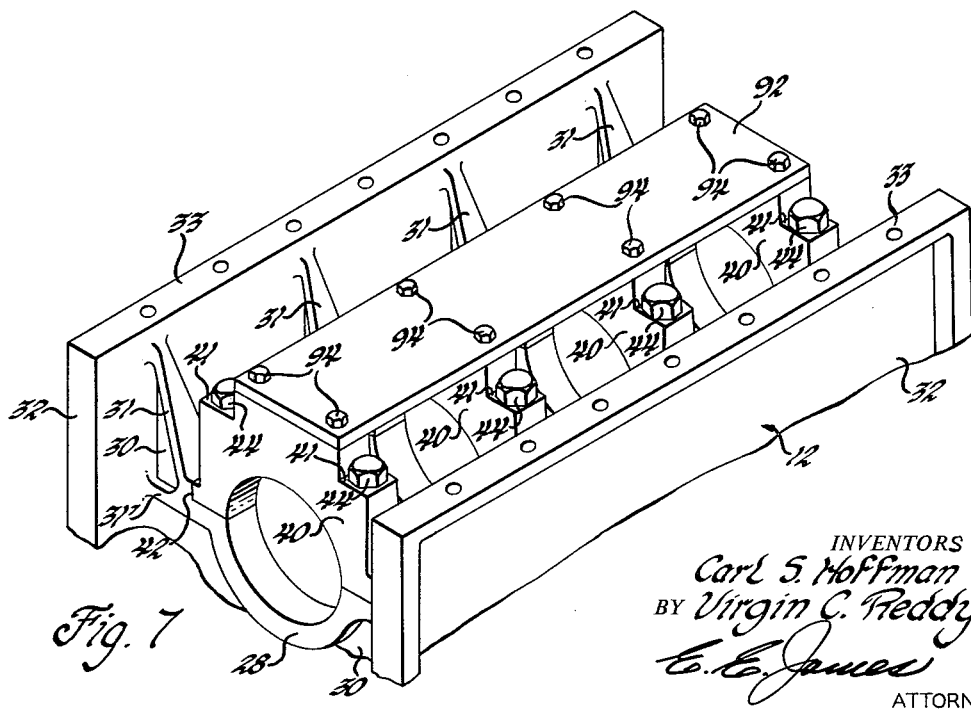
FIGURES 7, 8 and 9 are views similar to FIGURE 6 showing modified forms of the invention.

In the form of the invention shown in FIGURE 7, the several bearing caps 40 are structurally interconnected by a plate member 92. This plate member extends longitudinally of the crankcase structure and is perforated and secured to each of the several bearing caps by transversely spaced bolts indicated at 94. The plate member 92 thus provides the necessary load distributive rigidity between the several bearing caps independently of the crankcase side walls.

Figure 8:
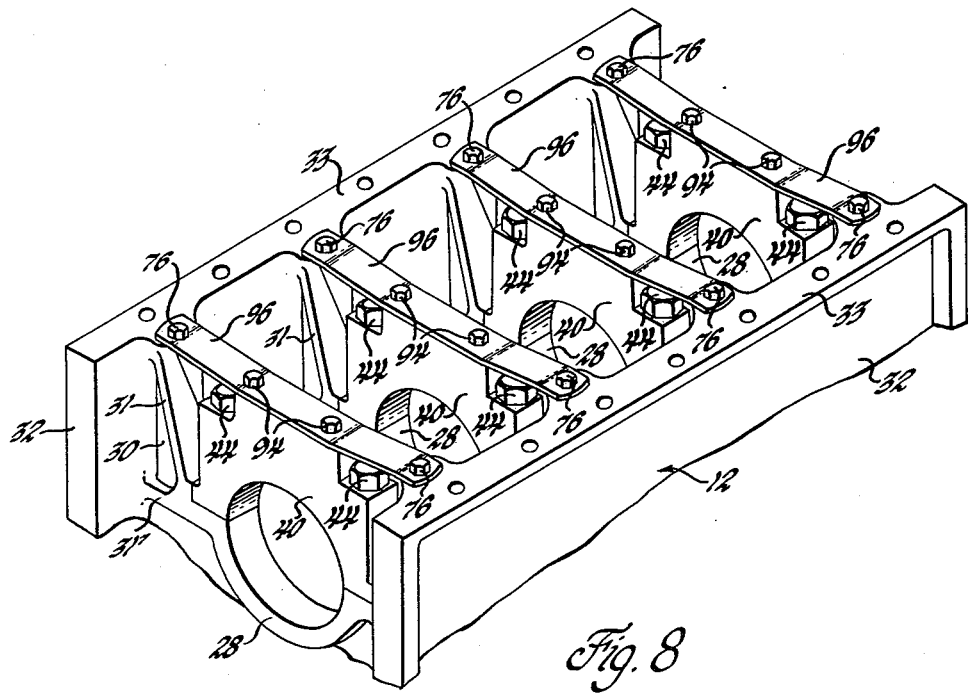

In the form of the invention shown in FIGURE 8, each of the bearing caps 40 is laterally connected to the adjacent crankcase pan rails 33 by load distributive tie straps or plates 96. The several plates 96 are secured outwardly to the adjacent end rails by bolts 76 and inwardly to their respective bearing caps by transversely spaced bolts 94.

Figure 9:
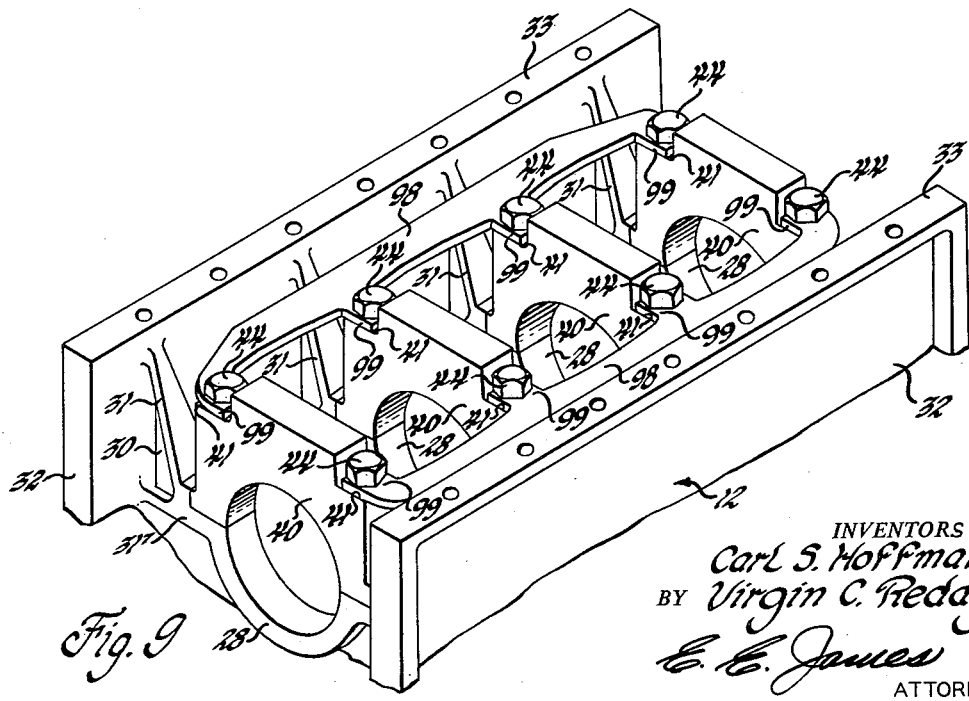

In the form of the invention shown in FIGURE 9, the several bearing caps 40 are structurally interconnected to provide the necessary load distributive rigidity thereto by two tie straps or plate members 98. The plate members 98 extend longitudinally and laterally outwardly of the several bearing caps and have spaced inwardly disposed projections 99. These projections are perforated to receive the cap bolts 44 which secure the tie plates 98 to the bolt clamping shoulders 41 of the bearing caps.

From the foregoing description of the several illustrative embodiments, it will be seen that the several indicated objectives and advantages of the invention are attainable by use of the several relatively inexpensive and lightweight tie plate members thereby substantially increasing crankcase and bearing cap strength and rigidity and providing greater load distribution thus reducing the stresses applied to the bearing supporting structures by crankshaft loads and deflections. It will be obvious to those skilled in the art that various changes might be made in the several illustrative embodiments without departing from the spirit and scope of the invention as defined in the following claims.

We claim:

1. In a V-type internal combustion engine having a multi-throw crankshaft rotatably mounted therein and a plurality of connecting rods journaled in pairs on the several throws thereof, a lightweight engine frame member comprising two longitudinally extending side walls and an upper cylinder supporting wall extending transversely therebetween to partially define a crankcase chamber closely embracing the swept arcs of the paired crankthrow journaled ends of said connecting rods, a plurality of crankshaft supporting semi-circular arches spaced longitudinally and extending transversely of the upper portion of said crankcase chamber and structurally connected to and supported by said chamber defining walls, said arches each having transversely spaced end faces extending in a diametrical plane parallel to the end of the side walls opposite said cylinder supporting wall and opposed side thrust shoulders normal to said end faces, a crankshaft supporting cap member piloted within each pair of opposed side thrust shoulders and having end faces thereon mateable with the end faces of the associated arch, said cap members extending downwardly from the end faces thereof to a plane adjacent said opposite side wall ends and without the swept arcs of said connecting rod ends, means for securing said cap members to their respective supporting arches, a plurality of load transmitting tie plates, each of said tie plates extending longitudinally between at least two adjacent bearing caps and laterally to the adjacent side wall without the swept arcs of said connecting rod ends, and means for securing said tie plates to said bearing supporting cap members and the adjacent side walls.

2. In a V-type internal combustion engine having a multi-throw crankshaft rotatably mounted therein and a plurality of connecting rods journaled in pairs on the several throws thereof, a lightweight engine frame member comprising two spaced and longitudinally extending side walls and a cylinder supporting wall extending transversely therebetween and partially defining a crankcase chamber closely embracing the swept arcs of the crankthrow journaled ends of said connecting rods, a plurality of crankshaft supporting semi-circular arches spaced longitudinally and extending transversely of the upper portion of said crankcase chamber and structurally connected to and supported by said walls, a crankshaft supporting cap member secured to and supported by each of said crankshaft supporting arches, said cap members extending downwardly from their respective supporting arches to bottom surfaces adjacent the lower ends of the side walls, and load transmitting tie plates extending longitudinally between and interconnecting adjacent cap members without the swept arcs of the connecting rod ends.

3. In the combination set forth in claim 2, each of said load transmitting tie plates extending longitudinally between and being secured to at least two adjacent cap members and being secured laterally outwardly of at least one of said cap members to the adjacent crankcase chamber defining side wall.

4. In the combination set forth in claim 3, said tie plates being of stamped configuration providing load transmitting reinforcing flanges and bosses extending longitudinally between said cap members and obliquely between their connections to the cap members and to the adjacent chamber defining side wall.

5. In a V-type internal combustion engine having a multi-throw crankshaft rotatably mounted therein and a plurality of connecting rods journaled in pairs on the several throws thereof, a lightweight engine frame member comprising two longitudinally extending side walls and a cylinder supporting wall extending transversely therebetween and partially defining a crankcase chamber closely embracing the swept arcs of the crankthrow journaled ends of said connecting rods, a plurality of crankshaft supporting semicircular arches spaced longitudinally and extending transversely of the upper portion of said crankcase chamber and structurally connected to and supported by said walls, a plurality of crankshaft supporting cap members each secured to and supported by an associated one of said arches, said cap members extending downwardly from their respective mounting arches to bottom surfaces thereof adjacent the lower ends of the side walls, and a plurality of load transmitting tie plates connecting the transversely opposite sides of each member laterally to the adjacent side wall without the swept arcs of the connecting rod ends.

6. In an internal combustion engine as defined in claim 5, said load transmitting tie plates extending longitudinally between and secured to at least two adjacent cap members.

7. In an internal combustion engine having a multi-throw crankshaft rotatably mounted therein and a plurality of connecting rods journaled on the several throws thereof, an engine frame member comprising two spaced and longitudinally extending side walls and a cylinder supporting wall extending transversely therebetween to at least partially define a crankcase chamber closely embracing the swept arcs of the crankthrow journaled ends of said connecting rods, a plurality of crankshaft supporting arches spaced longitudinally and extending transversely within the upper portion of said crankcase chamber between said crankcase chamber defining walls, said arches each having transversely spaced and diametrically aligned end faces in a plane parallel to the end of the side walls opposite said cylinder supporting wall and terminating in opposed side thrust shoulders extending normally from said end faces, a plurality of crankshaft supporting cap members each piloted within the opposed side thrust shoulders and having end faces thereon mateable with the end faces of an associated one of said arches, said cap members extending from the end faces thereof to a plane adjacent said opposite side wall ends and without the swept arcs of the connecting rod ends, means for securing each of said cap members to its respective mounting arch, a plurality of load transmitting tie plates extending longitudinally between adjacent bearing caps and laterally to the adjacent side wall without the swept arcs of the connecting rod ends, and means for securing said tie plates to said bearing supporting cap members and to said adjacent side walls.

8. In an internal combustion engine having a multi-throw crankshaft rotatably mounted therein and a plurality of connecting rods journaled on the several throws thereof, a lightweight engine frame member comprising two spaced and longitudinally extending side walls and a cylinder supporting wall extending transversely therebetween to at least partially define a crankcase chamber embracing the swept arcs of the crankthrow journaled ends of said connecting rods, a plurality of crankshaft supporting semi-circular arches spaced longitudinally and extending transversely of the upper portion of said crankcase chamber and structurally connected to and supported by said crankcase chamber defining walls, a supporting cap member adapted to be secured to and supported by each of said crankshaft supporting arches, said cap members extending from their respective supporting arches to a common plane adjacent the side wall ends distal from the cylinder supporting wall, transversely spaced bolts extending through and securing each of said cap members to its respective supporting arch, a plurality of load transmitting tie plates extending longitudinally between the cap members adjacent the side wall ends and without the swept arcs of the connecting rod ends, and means for securing said tie plates to said cap members.

9. In the combination set forth in claim 8, each of said load transmitting tie plates extending longitudinally between and being secured to at least two adjacent cap members and being secured laterally outwardly of at least one of said cap members to the adjacent crankcase chamber defining side wall.

10. In the combination set forth in claim 9, said tie plates being of stamped configuration providing load transmitting reinforcing flanges and bosses extending longitudinally between said cap members and obliquely between their connections to the cap members and to the adjacent chamber defining side wall.

11. In the combination set forth in claim 8, said tie plates being of stamped configuration providing load transmitting, plate reinforcing flanges and bosses extending longitudinally thereof between their connections to the several cap members.

12. In an internal combustion engine having a multi-throw crankshaft rotatably mounted therein and a plurality of connecting rods journaled on the several throws thereof, a lightweight frame member comprising two longitudinally extending side walls and a cylinder supporting wall extending transversely therebetween to at least partially define a crankcase chamber embracing the swept arcs of the crankthrow journaled ends of said connecting rods, a plurality of crankshaft supporting semi-circular arches spaced longitudinally and extending transversely of the upper portion of said crankcase chamber and structurally connected to and supported by said crankcase chamber defining walls, a plurality of bearing supporting cap members adapted to be secured to and supported by each of said crankshaft supporting arches, said cap members extending from their respective supporting arches to a common plane adjacent the side wall ends distal from the cylinder supporting wall, transversely spaced bolts extending through and securing each of said cap members to its respective mounting arch, a plurality of load transmitting tie plates extending laterally between the several cap members and the adjacent side wall ends, and means for securing said tie plates to said bearing supporting cap members and said adjacent side walls.

13. In the combination set forth in claim 12, each of said load transmitting tie plates extending laterally between said side walls and being secured to the transversely opposite sides of its respective cap member.

14. In the combination set forth in claim 12, each of said load transmitting tie plates extending longitudinally and being secured to at least two of said cap members without the swept arc of the connecting rod ends.

15. In the combination set forth in claim 14, said tie plates being of stamped configuration providing load transmitting reinforcing flanges and bosses extending longitudinally between said cap members and obliquely between their connections to the cap members and to the adjacent chamber defining side wall.

16. In an internal combustion engine, an engine frame member having two spaced and longitudinally extending side walls and a cylinder supporting wall extending transversely between said side walls to partially define a crankcase chamber, a plurality of crankshaft supporting arches spaced longitudinally and extending transversely between said crankcase chamber defining walls within the upper portion of said crankcase chamber, each of said arches having transversely spaced and diametrically aligned faces, a plurality of crankshaft supporting cap members each having end faces thereon mateable with the end faces of an associated one of said arches, means for securing each of said cap members to its respective supporting arch, a plurality of load transmitting tie plates extending longitudinally between the ends of the several cap members opposite their supporting arches and means for securing said tie plates to said cap members.

17. In an internal combustion engine, an engine frame member having two spaced and longitudinally extending side walls and a cylinder supporting wall extending transversely between said side walls to partially define a crankcase chamber, a plurality of longitudinally spaced crankshaft supporting arches extending transversely between said crankcase chamber defining walls within the upper portion of said crankcase chamber, each of said arches having transversely spaced and diametrically aligned end faces terminating in opposed side thrust shoulders, a plurality of crankshaft supporting cap members each having end and side faces thereon mateable with the end faces and thrust shoulders of an associated one of said arches, means for securing each of said cap members to its respective supporting arch, a plurality of load transmitting tie plates each extending longitudinally between several adjacent cap members, and means for securing said tie plates to their respective cap members remotely of their respective supporting arches.

18. In an internal combustion engine as set forth in claim 17, means for securing each of said tie plates laterally of the cap members to the adjacent side wall of the frame member.

19. In an internal combustion engine, an engine frame member having two spaced and longitudinally extending side walls and a cylinder supporting wall extending transversely therebetween to partially define a crankcase chamber, a plurality of longitudinally spaced crankshaft supporting arches extending transversely of said walls within the upper portion of said crankcase chamber, each of said arches having transversely spaced and diametrically aligned end faces terminating in opposed side thrust shoulders, a plurality of bearing supporting cap members each having end and side faces thereon mateable with the end faces and thrust shoulders of said arches, means for securing each of said cap members to one of said arches, a plurality of load transmitting tie plates extending laterally between each of said cap members and the side walls adjacent thereto, and means for securing said tie plates to their respective cap members and the adjacent side walls.

20. In the combination set forth in claim 19, each of said load transmitting tie plates extending laterally between said side walls and being secured to the transversely opposite sides of its respective cap member.

References Cited in the file of this patent
UNITED STATES PATENTS

| | | |
|---|---|---|
| 2,287,399 | Ware et al. | June 23, 1942 |
| 2,752,896 | Emele | July 3, 1956 |